(12) United States Patent
Ye et al.

(10) Patent No.: US 7,114,145 B2
(45) Date of Patent: *Sep. 26, 2006

(54) SYSTEM AND METHOD FOR LITHOGRAPHY SIMULATION

(75) Inventors: Jun Ye, Palo Alto, CA (US); Yen-Wen Lu, Los Altos, CA (US); Yu Cao, Cupertino, CA (US); Luoqi Chen, San Jose, CA (US); Xun Chen, Palo Alto, CA (US)

(73) Assignee: Brion Technologies, Inc., Santa Clara, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/989,972

(22) Filed: Nov. 16, 2004

(65) Prior Publication Data

US 2005/0091633 A1 Apr. 28, 2005

Related U.S. Application Data

(62) Division of application No. 10/815,573, filed on Apr. 1, 2004, now Pat. No. 7,003,758.

(60) Provisional application No. 60/509,600, filed on Oct. 7, 2003.

(51) Int. Cl.
*G06F 17/50* (2006.01)
*G03F 1/00* (2006.01)
*G21K 5/00* (2006.01)
*G06F 19/00* (2006.01)

(52) U.S. Cl. .............................. 716/21; 430/5; 378/35; 700/97; 700/120; 700/121; 250/492.22

(58) Field of Classification Search .................. 716/21; 430/5; 378/35; 700/97, 120, 121; 250/492.22
See application file for complete search history.

(56) References Cited

U.S. PATENT DOCUMENTS 4,926,489 A 5/1990 Danielson et al.
(Continued)

FOREIGN PATENT DOCUMENTS

JP 2001084369 A * 3/2001

OTHER PUBLICATIONS

"Compact Formulation of Mask Error Factor for Critical Dimension Control in Optical Lithography", Zhang, et al., Microlithography, SPIE 2002, 4 pages.

(Continued)

*Primary Examiner*—Phallaka Kik
(74) *Attorney, Agent, or Firm*—Neil A. Steinberg

(57) ABSTRACT

There are many inventions described and illustrated herein. In one aspect, the present invention is directed to a technique of, and system for simulating, verifying, inspecting, characterizing, determining and/or evaluating the lithographic designs, techniques and/or systems, and/or individual functions performed thereby or components used therein. In one embodiment, the present invention is a system and method that accelerates lithography simulation, inspection, characterization and/or evaluation of the optical characteristics and/or properties, as well as the effects and/or interactions of lithographic systems and processing techniques. In this regard, in one embodiment, the present invention employs a lithography simulation system architecture, including application-specific hardware accelerators, and a processing technique to accelerate and facilitate verification, characterization and/or inspection of a mask design, for example, RET design, including detailed simulation and characterization of the entire lithography process to verify that the design achieves and/or provides the desired results on final wafer pattern. The system includes: (1) general purpose-type computing device(s) to perform the case-based logic having branches and inter-dependency in the data handling and (2) accelerator subsystems to perform a majority of the computation intensive tasks.

54 Claims, 7 Drawing Sheets

U.S. PATENT DOCUMENTS

| | | | |
|---|---|---|---|
| 5,182,718 A | 1/1993 | Harafuji et al. | |
| 5,308,991 A | 5/1994 | Kaplan | |
| 5,563,702 A | 10/1996 | Emery et al. | |
| 5,594,850 A | 1/1997 | Noyama et al. | |
| 5,663,893 A | 9/1997 | Wampler et al. | |
| 5,680,588 A | 10/1997 | Cortych et al. | |
| 5,723,233 A | 3/1998 | Garza et al. | |
| 5,737,072 A | 4/1998 | Emery et al. | |
| 5,774,222 A | 6/1998 | Maeda et al. | |
| 5,888,675 A | 3/1999 | Moore et al. | |
| 6,077,310 A | 6/2000 | Yamamoto et al. | |
| 6,078,738 A | 6/2000 | Garza et al. | |
| 6,081,659 A | 6/2000 | Garza et al. | |
| 6,090,555 A | 7/2000 | Fiekowsky et al. | |
| 6,120,952 A | 9/2000 | Pierrat et al. | |
| 6,223,139 B1 | 4/2001 | Wang et al. | |
| 6,226,781 B1 | 5/2001 | Nistler et al. | |
| 6,243,855 B1 | 6/2001 | Kobayashi et al. | |
| 6,272,236 B1 | 8/2001 | Pierrat et al. | |
| 6,285,488 B1 | 9/2001 | Sandstrom | |
| 6,335,151 B1* | 1/2002 | Ausschnitt et al. | 430/322 |
| 6,370,679 B1 | 4/2002 | Chang et al. | |
| 6,372,391 B1 | 4/2002 | Wolfe et al. | |
| 6,397,165 B1 | 5/2002 | Fiekowsky | |
| 6,405,153 B1 | 6/2002 | Fiekowsky | |
| 6,449,749 B1 | 9/2002 | Stine | |
| 6,453,452 B1 | 9/2002 | Chang et al. | |
| 6,453,457 B1 | 9/2002 | Pierrat et al. | |
| 6,470,489 B1 | 10/2002 | Chang et al. | |
| 6,504,644 B1 | 1/2003 | Sandstrom | |
| 6,519,501 B1 | 2/2003 | Pierrat et al. | |
| 6,539,331 B1 | 3/2003 | Fiekowsky | |
| 6,611,767 B1 | 8/2003 | Fiekowsky et al. | |
| 6,687,041 B1 | 2/2004 | Sandstrom | |
| 6,757,645 B1 | 6/2004 | Chang et al. | |
| 6,760,473 B1 | 7/2004 | Fiekowsky | |
| 6,765,651 B1 | 7/2004 | Fiekowsky et al. | |
| 6,803,554 B1 | 10/2004 | Ye et al. | |
| 6,806,456 B1 | 10/2004 | Ye et al. | |
| 6,816,302 B1 | 11/2004 | Sandstrom et al. | |
| 6,828,068 B1* | 12/2004 | Progler et al. | 430/5 |
| 6,828,542 B1 | 12/2004 | Ye et al. | |
| 6,884,984 B1 | 4/2005 | Ye et al. | |
| 6,893,800 B1* | 5/2005 | Jessen et al. | 430/311 |
| 6,969,837 B1* | 11/2005 | Ye et al. | 250/208.1 |
| 6,969,864 B1* | 11/2005 | Ye et al. | 250/559.4 |
| 7,003,758 B1* | 2/2006 | Ye et al. | 716/21 |
| 7,053,355 B1* | 5/2006 | Ye et al. | 250/208.1 |
| 7,074,530 B1* | 7/2006 | Progler et al. | 430/5 |
| 2003/0107770 A1 | 6/2003 | Klatchko et al. | |
| 2003/0138706 A1* | 7/2003 | Progler et al. | 430/5 |
| 2003/0226951 A1 | 12/2003 | Ye et al. | |
| 2003/0233630 A1* | 12/2003 | Sandstrom et al. | 716/19 |
| 2004/0053143 A1* | 3/2004 | Sandstrom | 430/5 |
| 2004/0058255 A1* | 3/2004 | Jessen et al. | 430/30 |
| 2004/0096883 A1 | 5/2004 | Fiekowsky et al. | |
| 2004/0119036 A1 | 6/2004 | Ye et al. | |
| 2004/0140418 A1 | 7/2004 | Ye et al. | |
| 2004/0184657 A1* | 9/2004 | Lin et al. | 382/159 |
| 2004/0222354 A1 | 11/2004 | Ye et al. | |
| 2004/0225488 A1 | 11/2004 | Wang et al. | |
| 2004/0232313 A1 | 11/2004 | Ye et al. | |
| 2005/0076322 A1* | 4/2005 | Ye et al. | 716/20 |
| 2005/0091633 A1 | 4/2005 | Ye et al. | |
| 2005/0097500 A1 | 5/2005 | Ye et al. | |
| 2005/0118515 A1* | 6/2005 | Progler et al. | 430/5 |
| 2005/0120327 A1 | 6/2005 | Ye et al. | |
| 2005/0122500 A1 | 6/2005 | Ye et al. | |
| 2005/0166174 A1 | 7/2005 | Ye et al. | |
| 2005/0219502 A1* | 10/2005 | Sandstrom et al. | 355/77 |
| 2006/0000964 A1* | 1/2006 | Ye et al. | 250/208.1 |

OTHER PUBLICATIONS

"A Simulation Framework for Lithography Process Monitoring and Control Using Scatterometry", Bao et al., AEC/APC 2001, 4 pages.

"A Novel Approach for Modeling and Diagnostics of Lithography Process", Wang et al., AEC/APC 2001, 5 pages.

"Optimum sampling for characterization of systematic variation in photolithography", Cain et al., Microlithography, SPIE 2002, 13 pages.

"Electrical linewidth metrology for systematic CD variation characterization and causal analysis", Cain et al., Microlithography, SPIE 2003, 12 pages.

"Improved Method for Measuring and Assessing Reticle Pinhole Defects for the 100nm Lithography Node", Taylor et al., Photomask Japan 2002, Apr. 2002.

"Mask Defect Disposition: Flux-Area Measurement of Edge, Contact, and OPC Defects Correlates to Wafer and Enables Effective Decisions", Fiekowsky et al., Photomask Japan 2001, Paper 4409-10, Apr. 2001.

"Contact Holes: Optical Area Measurement Predicts Printability and is Highly Repeatable", By Glen Scheid, LSI Logic Corp.; Taylor et al., Photomask Japan 2001, Paper 4409-11, Apr. 2001.

"New Optical Metrology for Masks: Range and Accuracy Rivals SEM", Cottle et al., Photomask Japan 2001, Poster 4409-60, Apr. 2001.

"Soft Defect Printability: Correlation to Optical Flux-Area Measurements", Taylor et al., the SPIE 20th Annual BACUS Symposium on Photomask Technology and Management, Conference 4186, Sep. 2000.

"The End of Thresholds: Subwavelength Optical Linewidth Measurement Using the Flux-Area Technique", Fiekowsky, Photomask Japan 2000, Poster 4066-67, Apr. 2000.

"Defect Printability Measurement in the KLA-351: Correlation to Defect Sizing Using the AVI Metrology System", Fiekowsky et al., the SPIE 19th Annual BACUS Symposium on Photomask Technology and Management, Conference 3873, Sep. 1999.

"Accurate and Repeatable Mask Defect Measurements for Quarter-Micron Technology", Fiekowsky, the SPIE 17th Annual BACUS Symposium on Photomask Technology and Management, Sep. 1997.

"The AVI Photomask Metrology System", Automated Visual Inspection Presentation, Feb. 2002, 25 pages.

"Photomask Production Integration of KLA STARlight™ 3000 System", Kalk et al, Proc. Of SPIE, vol. 2621, 15th Annual BACUS Symposium on Photomask Technology and Management, Dec. 1995, pp. 112-121.

"Defect Detection and Classification in VLSI Pattern Inspection", Soo-Ik Chae, Sep. 1987, Ph.D. Dissertation.

* cited by examiner

SYSTEM AND METHOD FOR LITHOGRAPHY SIMULATION

CROSS-REFERENCE TO RELATED APPLICATIONS

This application is a divisional of application Ser. No. 10/815,573, filed Apr. 1, 2004 (now U.S. Pat. No. 7,003,758), which claims priority to U.S. Provisional Application Ser. No. 60/509,600, entitled "System and Method of Fast Lithography Simulation", filed Oct. 7, 2003, the contents of which are incorporated by reference herein in their entirety.

In addition, this application is related to the following U.S. patent applications: "System and Method of Lithography Simulation", Ser. No. 10/981,914, filed Nov. 4, 2004, now U.S. Patent Application Publication No. 2005/0097500; "System and Method of Lithograph Simulation". Ser. No. 11/024,121, filed Dec. 28, 2004, now U.S. Patent Application Publication No. 2005/0120327; "System and Method of Lithography Simulation", Ser. No. 11/037,988, filed Jan. 18, 2005, now U.S. Patent Application Publication No. 2005/0122500; and "System and Method of Lithoaraphy Simulation". Ser. No. 11/084,484, filed Mar. 18, 2005, now U.S. Patent Application Publication No. 2005/0166174.

BACKGROUND OF THE INVENTION

This invention relates to systems and techniques that are used to measure, inspect, characterize, simulate and/or evaluate the performance of lithographic systems and techniques; and more particularly, in one aspect, to measure, inspect, characterize, simulate and/or evaluate the optical characteristics and effects of lithographic systems and processing techniques (for example, systems and techniques implemented in the semiconductor fabrication/processing environments).

Briefly, in the semiconductor industry, microlithography (or simply lithography) is the process of printing the circuit patterns on a semiconductor wafer (for example, a silicon or GaAs wafer). Currently, optical lithography is the predominant technology used in volume semiconductor manufacturing. Such lithography employs light in the visible to deep ultraviolet spectrum range to expose the resist on wafer. In the future, extreme ultraviolet (EUV) and soft x-rays may be employed. Following exposure, the resist is developed to yield a relief image.

In optical lithography, a photomask (often called mask or reticle) is first written using electron-beam or laser-beam direct-write tools. A typical photomask for optical lithography consists of a glass (or quartz) plate of six to eight inches on a side, with one surface coated with a thin metal layer (for example, chrome) of a thickness of about 100 nm. The chip pattern is etched into the metal layer, hence allowing light to transmit through. The area where the metal layer is not etched away blocks light transmission. In this way, a pattern may be projected onto a semiconductor wafer.

The photomask contains certain patterns and features that are used to create desired circuit patterns on a wafer. The tool used in projecting the mask image onto wafer is called a stepper or scanner (hereinafter collectively called "photolithographic equipment", "scanner", or "stepper"). With reference to FIG. 1, the block diagram schematic of an optical projection lithographic system 10 of a conventional stepper includes an illumination source 12, an illumination pupil filter 14, lens subsystem 16a–c, mask 18, projection pupil filter 20, and wafer 22 on which the aerial image of mask 18 is projected.

With reference to FIG. 1, by way of background, illumination source 12 may be laser source operated, for example, at UV (ultra-violet) or DUV (deep ultra-violet) wavelengths. The light beam is been expanded and scrambled before it is incident on illumination pupil 14. The illumination pupil 14 may be a simple round aperture, or have specifically designed shapes for off-axis illumination. Off-axis illumination may include, for example, annular illumination (i.e., the pupil is a ring with a designed inner and outer radius), quadruple illumination (i.e., the pupil has four openings in the four quadrant of the pupil plane), and other shapes like dipole illumination. FIGS. 2A and 2B illustrate exemplary annular and quadruple illumination, respectively.

With continued reference to FIG. 1, after illumination pupil 14, the light passes through the illumination optics (for example, lens subsystem 16a) and is incident on photomask (or mask) 18. The mask 18 contains the circuit pattern to be imaged on wafer 22 by the projection optics. As the desired pattern size on wafer 22 becomes smaller and smaller, and that pattern becomes closer and closer to each other, the lithography process becomes more challenging. In an effort to improve imaging quality, current processing techniques employ resolution enhancement technologies ("RET"), such as, for example, optical proximity correction ("OPC"), phase shift masks ("PSM"), off-axis illumination ("OAI"), condenser and exit pupil filters, and techniques applying multi-level illumination (for example, FLEX).

Many of the RET technologies are applied on or directly to mask 18. For example, OPC and PSM, which modify the light wave to (1) compensate the imperfection of the imaging property of the projection optics, for example, the OPC technology is used to compensate the optical proximity effect due to light interference, and/or (2) take advantage of designed light interferences to enhance the imaging quality, for example, the phase shift mask technology is used to create phase shifting between neighboring patterns to enhance resolution.

Notably, mask 18 may not be "perfect", due to its own manufacturing process. For example, corners on mask 18 may not be sharp but may be rounded; and/or the linewidth may have a bias from design value where the bias may also depend on the designed linewidth value and neighboring patterns. These imperfections on mask 18 may affect the final imaging quality.

The projection optics (for example, lens subsystems 16b and 16c, and projection pupil filer 20) images mask 18 onto wafer 22. In this regard, the projection optics includes a projection pupil filter 20. The pupil 20 limits the maximum spatial frequency of the mask pattern that can be passed through the projection optics system. A number called "numerical aperture" or NA often characterizes pupil 20. There are also proposed RET techniques that modify pupil 20, which is generally called pupil filtering. Pupil filtering may include modulation for both the amplitude and the phase on the passing light beams.

Due to the wavelength of light being finite, and current techniques employing wavelengths that are larger than the minimum linewidth that is printed on wafer 22, there are typically significant light interference and diffractions during the imaging process. The imaging process is not a perfect replication of the pattern on mask 18. Current techniques employ physical theory to model this imaging process. Further, due to the high NA value of current lithography tools, different polarizations of the light provide different imaging property. To more accurately model this process, a vector-based model may be used.

The projection optics may be diffraction-limited. However, lens subsystem 16c in the projection optics is most often not completely "perfect". These imperfections may be modeled as aberrations, which are often abstracted as some undesired phase modulation at the pupil plane, and are often represented by a set of Zernike coefficients. After the light finally reaches the surface of wafer 22, they will further interact with the coatings on wafer 22 (for example, the photo-resist). In this regard, different resist thickness, different optical properties of the resist (for example, its refractive index), and different material stack under the resist (for example, bottom-anti-reflection-coating or BARC), may further affect the imaging characteristics itself. Some of these effects may also be abstracted by a modulation at the pupil plane.

When the resist is exposed by the image and thereafter baked and developed, the resist tends to undergo complex chemical and physical changes. First principle and empirical models have been developed to simulate these processes.

To design and evaluate the specific implementations of the mask, including a mask implementing RET, and to assess the impact on the quality of the printed pattern on wafer from the RET design combined with the stepper settings and characteristics, computer simulations have been employed to imitate the anticipated and/or expected results. Notably, physical models have been developed for nearly every step of the lithography process, including mask making, stepper's imaging path from illumination to on-wafer image, and the resist exposure and development.

Currently, there are a number of computer software techniques that address needs in lithography simulation. For example, there is first-principle-modeling-based simulation software that conducts detailed simulation of the physical and chemical processes, but runs extremely slow and hence limited to extremely small area of chip design (on the order of a few square microns), for example, "SOLID-C" from Sigma-C (Campbell, Calif., USA) and "Prolith" from KLA-Tencor (San Jose, Calif., USA). Although there is computer software that executes and provides simulation results faster, such software uses empirical models that are calibrated to the experimental data (for example, "Calibre" from Mentor-Graphics (Wilsonville, Oreg., USA). Even for the "fast" simulation that uses empirical model, a simulation at a full-chip level often requires tens of hours to many days.

Moreover, to more fully understand, design, analyze and/or predict the lithography process, the entire process, from illumination—to mask—to imaging—to resist, should, or may need to be analyzed and/or simulated. Due to the complex models and the large amount of design data (today's VLSI design data can reach tens of GB per layer), brute-force computation on general-purpose microprocessors tends to be unwieldy and time-consuming. Further, employing highly specialized mainframe computers would likely require an extensive investment thereby making the process uneconomical.

There is a need for a system and technique that accelerates lithography simulation, inspection, characterization and/or evaluation of the optical characteristics and/or properties, as well as the effects and/or interactions of lithographic systems and processing techniques that overcome one, some or all of the shortcomings of the conventional systems and approaches. There is a need for a system and technique that facilitates verification, characterization and/or inspection of RET designs, including detailed simulation of the entire lithography process to verify that the RET design achieves and/or provides the desired results on final wafer pattern.

Moreover, there exists a need for a system and technique that rapidly simulates, characterizes, inspects, verifies and/or enables RET designs and photolithographic equipment optimization and processes (for example, critical dimension ("CD", i.e., linewidth of the critical lines in the integrated circuit design), line-end pullback, edge placement error for one, some or every pattern at one, some or every location, and/or printing sensitivity to process variations such as mask error, focus, dose, numerical aperture, illumination aperture and/or aberration).

SUMMARY OF THE INVENTION

There are many inventions described and illustrated herein. In one aspect, the present invention is a system and method that accelerates lithography simulation, inspection, characterization and/or evaluation of the optical characteristics and/or properties, as well as the effects and/or interactions of lithographic systems and processing techniques. In a first principal aspect, the present invention is a system and method for simulating a lithographic design comprised of a plurality of polygons (which may or may not include resolution enhancement technology(ies)) arranged in a predetermined configuration. The system of this aspect of the invention comprises a microprocessor subsystem to convert the plurality of polygons to a pixel-based bitmap representation thereof (for example, a multi-level image such as 2, 4, 8, . . . 64, 128, 256 or gray-level). The pixel-based bitmap includes pixel data, wherein each pixel datum represents a pixel having a predetermined pixel size.

The system further includes an accelerator subsystem, coupled to the microprocessor subsystem, to calculate at least a portion of the aerial image of the lithographic design using the pixel-based bitmap representation of the lithographic design. The accelerator subsystem includes a plurality of programmable gate arrays configured to process the pixel data in parallel.

In one embodiment, the pixel size may be greater than the Nyquist frequency in the aerial image of the lithographic design and/or determined using the numerical aperture and wavelength of a projection optics of a lithographic tool.

In another embodiment, the system includes a plurality of accelerator subsystems, each accelerator subsystem being coupled to the microprocessor subsystem and provided a portion of the pixel-based bitmap. Each accelerator subsystem calculates an aerial image of the lithographic design corresponding to the portion of the pixel-based bitmap using the pixel data associated therewith. The plurality of accelerator subsystems, in one embodiment, each performs Fast Fourier Transforms, using pixel data, to generate the corresponding portion of the aerial image. Notably, the microprocessor subsystem of these embodiments may include a plurality of microprocessors wherein each microprocessor is coupled to at least one associated accelerator subsystem.

The accelerator subsystem may also calculate an aerial image in resist formed on a wafer using the pixel-based bitmap representation of the lithographic design and a coefficient matrix representing projection and illumination optics of a lithographic tool.

The accelerator subsystem may calculate a pattern formed on the wafer by the lithographic design using the pixel-based bitmap representation of the lithographic design and the coefficient matrix representing projection and illumination optics of a lithographic tool.

The system of this invention may also include a processing system, coupled to the microprocessor subsystem and the accelerator subsystem, to compare the calculated pattern on the wafer to a desired, predetermined pattern. The processing system may, in addition or in lieu thereof, (1) determine a CD of the lithographic design, (2) detect an error in the lithographic design in response to a comparison between the calculated pattern on the wafer and a desired/predetermined pattern, and/or (3) determine edge placement of the lithographic design using the calculated pattern on the wafer. Notably, in response to detecting the error, the processing system may determine a modification to the lithographic design to correct the error in the lithographic design.

Moreover, the processing system may determine a printing sensitivity using patterns on the wafer calculated in response to varying the coefficients of the matrix representing projection and illumination optics of a lithographic tool. The coefficients of the matrix representing projection and illumination optics of a lithographic tool may be representative of one or more of a focus, dose, numerical aperture, illumination aperture, and aberration. Indeed, the processing system may determine a set of parameters of the projection and illumination optics of the lithographic tool using the printing sensitivity.

In another principal aspect, the present invention is a system and method for simulating a lithographic design (comprised of plurality of polygons (which may or may not include resolution enhancement technology(ies)) arranged in a predetermined configuration). The system comprises a microprocessor subsystem, including a plurality of microprocessors, to convert the lithographic design to a pixel-based bitmap representation thereof (for example, a multi-level image such as 2, 4, 8, . . . 64, 128, 256 or gray-level). The pixel-based bitmap includes pixel data, wherein each pixel datum represents a pixel having a predetermined pixel size (for example, determined using the numerical aperture and wavelength of a projection optics of a lithographic tool and/or greater than the Nyquist frequency in the aerial image of the lithographic design).

The system further includes a plurality of accelerator subsystems, wherein each accelerator subsystem includes a plurality of programmable integrated circuits configured to process the pixel data in parallel. In addition, each accelerator subsystem is connected to an associated microprocessor to calculate a portion of an aerial image of the lithographic design using the corresponding portion of the pixel-based bitmap representation of the lithographic design. In certain embodiments, each of the accelerator subsystems performs Fast Fourier Transforms, using pixel data, to generate the corresponding portion of the aerial image.

The plurality of accelerator subsystems, in one embodiment, calculate an aerial image in resist formed on a wafer by the lithographic design using the pixel-based bitmap representation of the lithographic design and a coefficient matrix representing projection and illumination optics of a lithographic tool. In another embodiment, the accelerator subsystems calculate a pattern formed on the wafer by the lithographic design using the pixel-based bitmap representation of the lithographic design and the coefficient matrix representing projection and illumination optics of a lithographic tool.

The system may further include a processing system, coupled to the microprocessor subsystems and the accelerator subsystems, to: (1) compare the calculated pattern on the wafer to a desired/predetermined pattern, and/or (2) determine a CD of the lithographic design using the calculated pattern on the wafer, and/or (3) determine an edge placement of the lithographic design using the calculated pattern on the wafer, and/or (4) determine a printing sensitivity using patterns on the wafer calculated in response to varying the coefficients of the matrix representing projection and illumination optics of a lithographic tool (for example, one or more of a focus, dose, numerical aperture, illumination aperture, and aberration of the projection and illumination optics). Indeed, the processing may determine a set of parameters of the projection and illumination optics of the lithographic tool using the printing sensitivity.

Moreover, the processing system may (in addition or in lieu thereof) detect an error in the lithographic design in response to a comparison between the calculated pattern on the wafer and a desired, predetermined pattern. In response to detecting the error, the processing system determines a modification to the lithographic design to correct the error in the lithographic design.

Again, there are many inventions described and illustrated herein. This Summary of the Invention is not exhaustive of the scope of the present invention. Moreover, this Summary is not intended to be limiting of the invention and should not be interpreted in that manner. While certain embodiments, features, attributes and advantages of the inventions have been described in this Summary, it should be understood that many others, as well as different and/or similar embodiments, features, attributes and/or advantages of the present inventions, which are apparent from the description, illustrations and claims, which follow.

BRIEF DESCRIPTION OF THE DRAWINGS

In the course of the detailed description to follow, reference will be made to the attached drawings. These drawings show different aspects of the present invention and, where appropriate, reference numerals illustrating like structures, components, materials and/or elements in different figures are labeled similarly. It is understood that various combinations of the structures, components, materials and/or elements, other than those specifically shown, are contemplated and are within the scope of the present invention.

DETAILED DESCRIPTION

There are many inventions described and illustrated herein. In one aspect, the present invention is directed to a technique of, and system for simulating, verifying, inspecting, characterizing, determining and/or evaluating the lithographic designs, techniques and/or systems, and/or individual functions performed thereby or components used therein. In one embodiment, the present invention is a system and method that accelerates lithography simulation, inspection, characterization and/or evaluation of the optical characteristics and/or properties, as well as the effects and/or interactions of lithographic systems and processing techniques. In this regard, in one embodiment, the present invention employs a lithography simulation system architecture, including application-specific hardware accelerators, and a processing technique to accelerate and facilitate verification, characterization and/or inspection of a mask design, for example, RET design, including detailed simulation and characterization of the entire lithography process to verify that the design achieves and/or provides the desired results on final wafer pattern. The system includes: (1) general purpose computing device(s) to perform the case-based logic having branches and inter-dependency in the data handling and (2) accelerator system to perform a majority of the computation intensive tasks.

Figure 1:
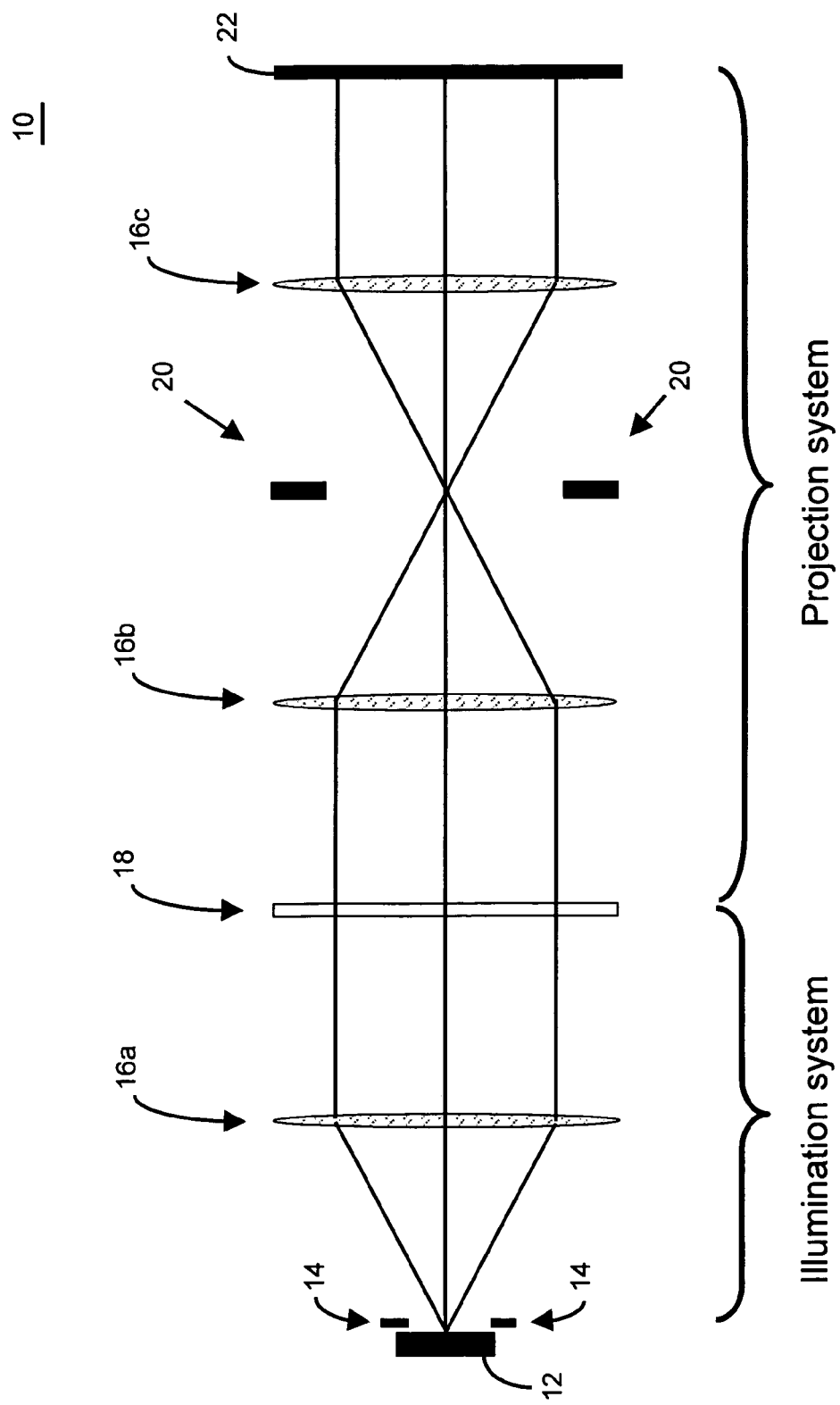
FIG. 1 is a schematic representation of the optical path in a step-and-repeat or step-and-scan optical lithography system with refractive optics (referred to as stepper in later text). The mask contains the circuit pattern to be imaged on the wafer by the reduction lens system.
Figure 2B:
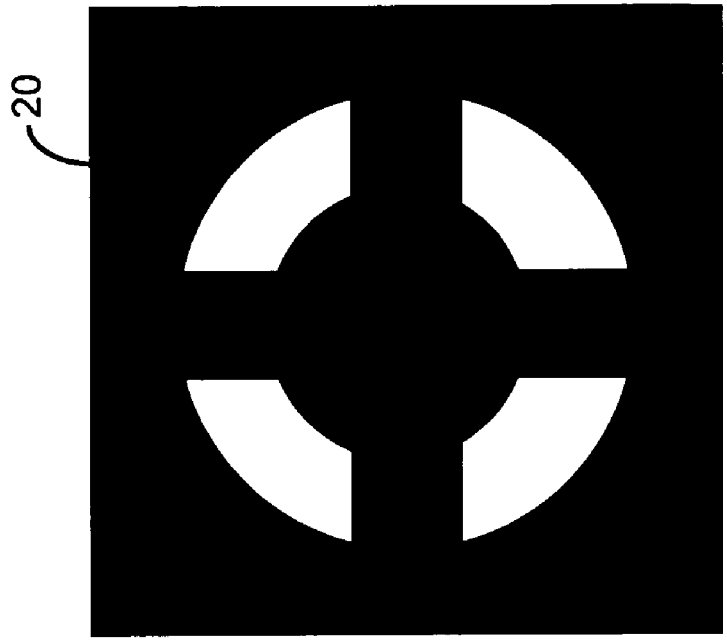
FIGS. 2A and 2B illustrate exemplary conventional annular and quadruple illumination pupils, respectively.
Figure 2A:
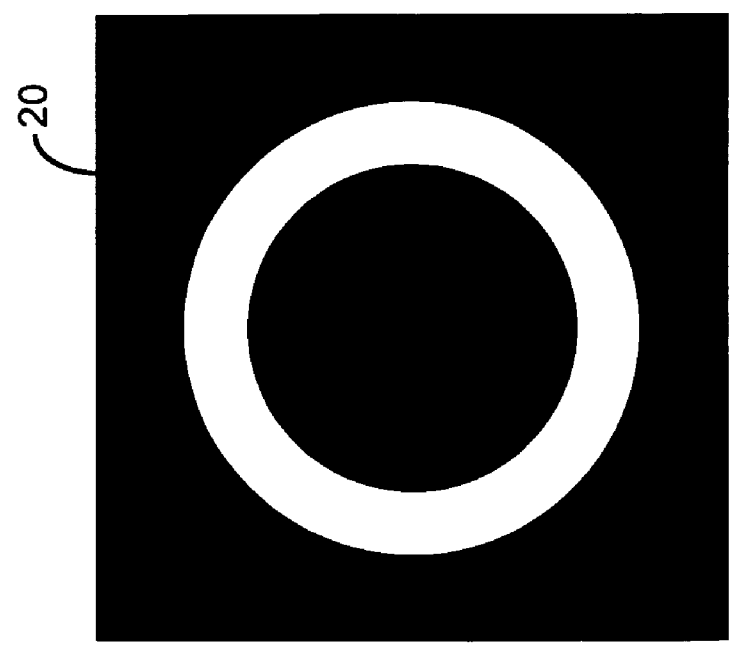
Figure 3:
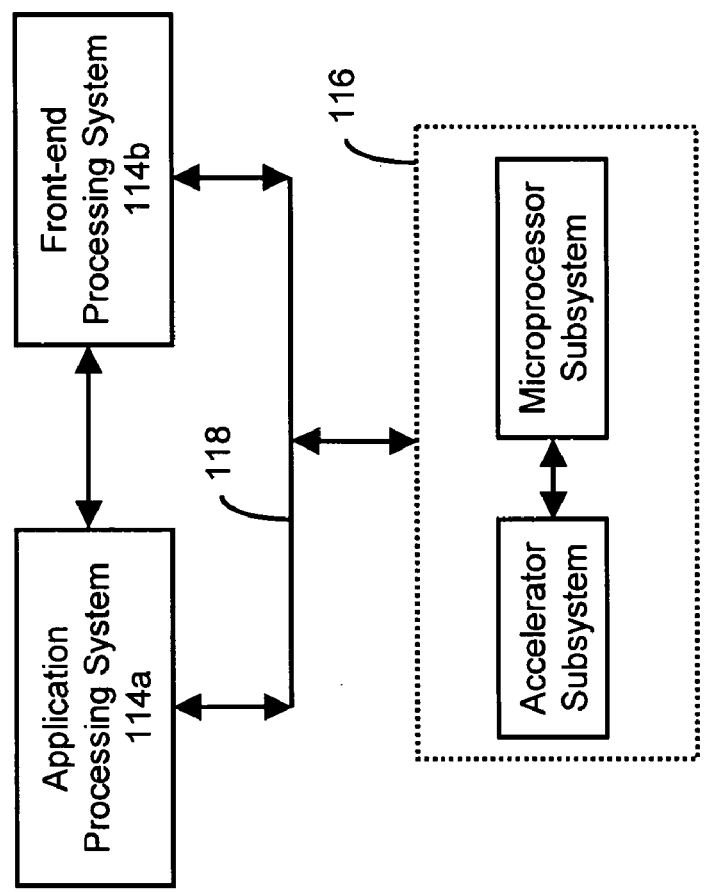
FIG. 3 is a schematic block diagram of a lithographic simulation system, according to certain embodiments of certain aspects of the present inventions.

In particular, with reference to FIG. 3, in one embodiment, general purpose-type computing device(s) 112 are programmed and/or configured to handle job management of the overall operations of system 110 including, for example, partitioning the design database for analysis and conversion by accelerator system 116. In addition, general purpose-type computing device(s) 112 facilitates interaction with the user or operator (i.e., the "outside world") via, for example, client computer(s) (not illustrated) that provide operator or user access to system 110 for job setup and/or results review/analysis.

With continued reference to FIG. 3, accelerator system 116 may be programmed to perform case-based logic having branches and inter-dependency in the data handling. In this regard, accelerator system 116 includes a microprocessor subsystem to manipulate and process the polygon (or the like) patterns that are typical with conventional lithographic simulation and design systems/techniques. Since there are many polygons in a typical design, and there are many different types and cases of polygons, system 110 employs microprocessor subsystem of accelerator system 116 to implement programs or routines that manipulate the case-based logic (for example, "if this case, then; else if, then; and so on").

The accelerator system 116 further includes suitably a programmed and configured accelerator subsystem (including application-specific hardware accelerators) that is coupled to the microprocessor subsystem to perform pixel-based image processing (for example, pixel-based gray-level image simulation). The pixel-based image processing may involve pixel-based computation, for example, filtering, re-mapping, Fourier Transform or other types of transformation. In these pixel-based computations, the data inter-dependency is minimized—which facilitates implementing parallel and pipelined computation.

Figure 4:
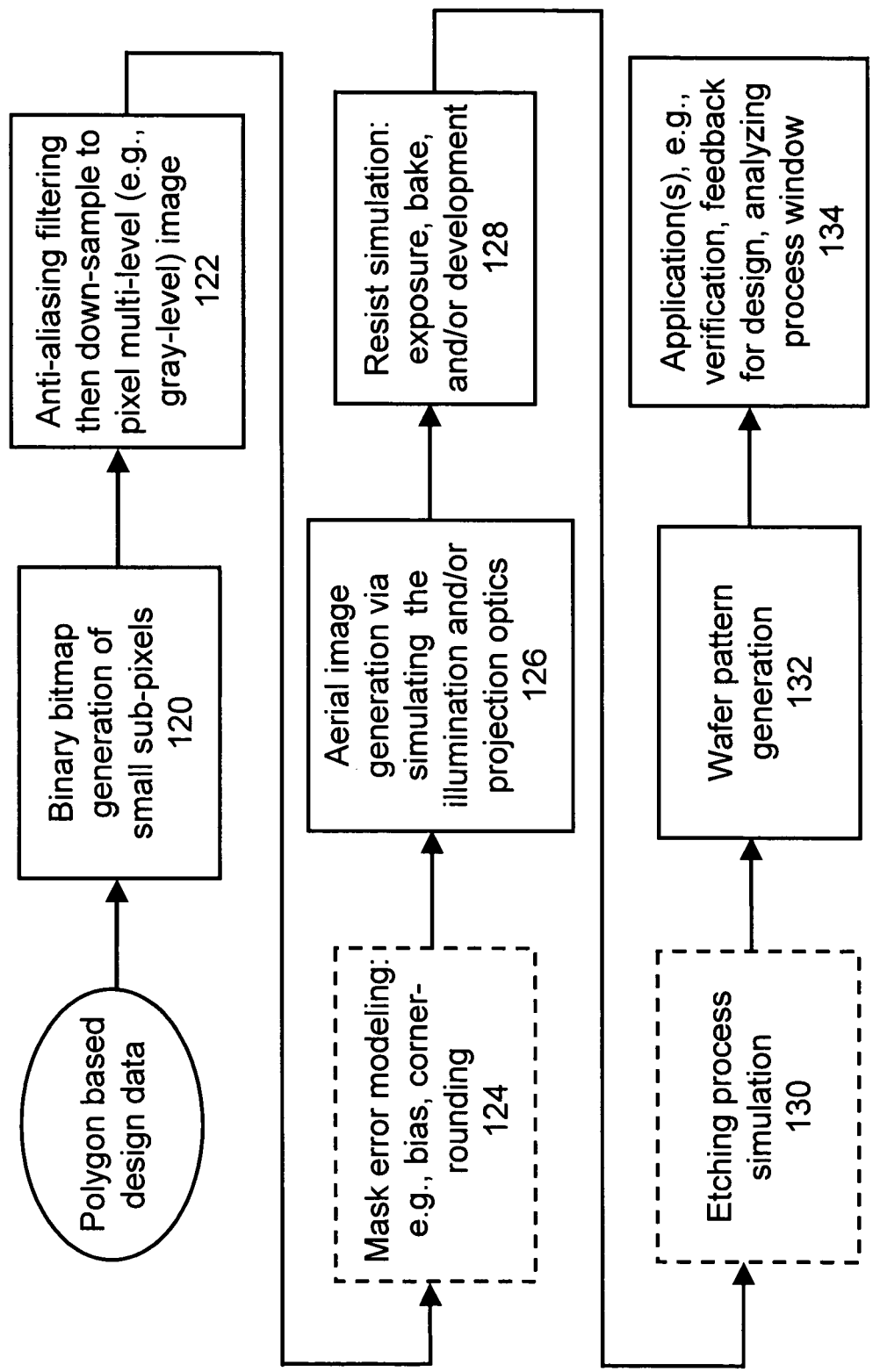
FIG. 4 is a flow chart of the simulation process, according to certain embodiments of certain aspects of the present inventions.

With reference to FIG. 4, in one embodiment of the present invention, the lithography simulation, inspection, characterization and/or evaluation process includes pixel based lithography simulation. In those instances where the design database is based on polygons or the like, system 110 converts the polygon based database (containing the particular design) to a pixel-based image(s) (see, box 120 and 122). There are many techniques for converting a polygon (or the like) to a multi-level image (for example, 2, 4, 8, . . . 64, 128, 256 or gray-level image). All such techniques, whether now known or later developed, are intended to be within the scope of the present invention. For example, one method of conversion involves two major processes:

(1) Fill a sub-pixel binary bitmap using scan-line process or technique. The sub-pixel size can be selected to be a fraction of the final pixel size, for example, ⅛ of a pixel. For each sub-pixel, if the sub-pixel is within a polygon, the sub-pixel is filled in 1; otherwise it is filled in 0. More sophisticated techniques include dithering, which is able to increase the filling resolution without reducing the sub-pixel size, but fill some sub-pixels as 1 and others as 0 if some neighboring sub-pixels are on the polygon edge (hence not completely inside nor completely outside a polygon). Dithering is a standard computer graphics technique; and/or (2) Apply an anti-aliasing filter to the sub-pixel binary bitmap, and at the same time down-sample the bitmap image to a pixel-sized multi-level image (for example, gray level image). Anti-aliasing filter is a standard technique in image processing, and is used to limit the spatial frequency band of the image before down-sampling, so as to avoid aliasing. The design of the anti-aliasing filter needs to minimize the frequency content that will be folded back into the frequency band after down-sampling.

One significant advantage of using these two techniques in the polygon-to-gray-image conversion is that the polygon overlap is then automatically addressed. That is, when there is overlap of a polygon structure, a sub-pixel is filled with 1 twice when it resides in an overlapped area (or "filled" with 1 multiple times if the overlap involves more than two polygons), with the final filled value still being 1. So, any overlap is automatically resolved during the conversion process.

A significant decision in this image conversion step is the selection of the pixel size. In this regard, implementing a larger pixel size may result in a smaller amount of computation required in the downstream or later processing, and a larger induced image processing error. In one embodiment, the pixel size is selected so that it can sample the image above Nyquist frequency in the aerial image. It is well known in the science of optical lithography that, regardless of illumination, partial coherence, and/or RET (for example, OPC and PSM) on masks, the maximum spatial frequency in the light intensity distribution on wafer plane may be characterized as $2 \times NA/\lambda$, where NA is the Numerical Aperture of the stepper projection optics, and $\lambda$ is the wavelength used in the imaging. It is also known in image processing that, if the sampling frequency is above twice of the maximum spatial frequency existing in the original image, one can accurately re-construct the original image from the sampled image. This is known as the Nyquist theorem, and the 2× of the maximum existing spatial frequency in the original image is called the Nyquist frequency. Accordingly, employing this relationship, the Nyquist sampling rate for aerial image in a stepper is $4 \times NA/\lambda$. As such, the pixel size may be at $\rho = \lambda/(4 \times NA)$ or smaller. For examples, for wavelength of 193 nm, and NA=0.65, the pixel size $\rho$ may be 74 nm or smaller. For wavelength of 248 nm, and NA=0.65, the pixel size $\rho$ may be 95 nm or smaller.

It should be noted that the pixel size selection described above is at the wafer aerial image level. Certain steppers implement an image size reduction when imaging from mask to wafer, and the pixel size on mask may be adjusted. For example, if the stepper reduction ratio is 4×, then the Nyquist sampling pixel size on mask is 4× larger than that on the wafer. Thus, under these circumstances, the sampling pixel size may be adjusted.

The converted pixel-based gray level image is representative of the mask. Mask RET (for example, OPC and PSM)

may be incorporated into this image, since the RET features are typically part of the polygon database. For example, in the context of OPC, the decorations are typically extra polygons, so they automatically become part of the gray-level image. In the context of PSM, if there are only two types of phases "0" and "180" degrees, the sub-pixel bitmap may be filled with "−1" in the 180-degree phase region during the polygon-to-bitmap conversion, and the final gray-level image will involve both positive and negative values. Indeed, where the PSM includes phase differences beyond just 0 and 180 degrees, the bitmap value may include a corresponding phase factor, and the gray-level image may also consist of complex numbers, where a complex number includes real and imaginary part.

As mentioned above, conversion of the design database (consisting of polygons or the like) to a pixel-based image(s) (see, box 120 and 122) is performed and/or accomplished by the microprocessor subsystem of accelerator system 116.

In one embodiment, anti-aliasing filtering techniques may be implemented (see, box 122). That is, since the anti-aliasing filtering may be implemented as a linear operation, the different phase layers may be converted to binary bitmap then to a multi-level image (for example, gray-level image) individually, then multiplied with their individual phase factor, then added up to obtain a final multi-level image (for example gray-level image) with complex pixel values. The anti-aliasing filtering techniques (box 122), in one embodiment, may be performed and/or accomplished by accelerator system 116 using the binary bitmap image of the polygon design database (output of box 120).

With continued reference to FIG. 4, after the design database is converted to a gray-level image, in one embodiment, that image may be applied to processing to model the systematic mask errors into the image (see, box 124). For example, common mask errors include bias and corner rounding, caused by the imperfections in the mask's manufacturing process, for example, ebeam proximity effect and resist development. Corner rounding refers to the fact that corners on mask are not sharp but rounded (caused by, for example, the finite size of writing beam spot, and the resist development low-pass effect), and can be modeled by introducing an edge rounding effect for all corners, for example, using a quarter of a circle to replace the sharp 90 degree intersection of two straight edges.

Bias refers to the difference between the actual linewidth and the design value (which may be caused by, for example, the resist over-development or under-development). Notably, that difference may depend on the designed linewidth value and neighboring patterns (caused by, for example, ebeam proximity effect). Bias can often be modeled by a gray-level morphological operation on the image, with a dilation or erosion value that depends on the pattern's size and pattern's neighborhood to account for the proximity effect. These techniques are well known to those skilled in image processing.

Notably, the mask error modeling function (box 124) may be optional and, as such is represented in a dashed line format. For example, in those instances where the masks are made with high quality techniques, the final effect on wafer due to mask error maybe negligible. Accordingly, this mask error modeling need not be implemented.

Further, the mask error modeling function (box 124), in one embodiment, may be performed and/or accomplished by the accelerator subsystem of accelerator system 116 using, for example, the bitmap image of the polygon design database, as described above.

With continued reference to FIG. 4, the next process is to model the aerial imaging path through the projection optics and under the designed illumination scheme (see, box 126). The physical imaging model has been well established in optical science, either scalar or vector imaging model may be used. Vector model is becoming more important as the optical lithography moves to high-NA systems (high NA generally refers to NA larger than 0.6). Over the past decade, there have been various techniques developed to speed up the computation.

One example is to decompose the total imaging system into a series of coherent imaging systems with decreasing importance, i.e., smaller and smaller eigenvalues of a matrix called Transmission Cross Coefficients (TCC) which is a matrix defined by the projection and illumination optics but independent of the mask pattern itself. The decomposed coherent systems are often called as eigen-systems. Depending on the accuracy requirement, various numbers of eigen-systems can be included. The majority of the aerial image computations may employ Fast Fourier Transforms (FFTs), both forward and backward, to generate the aerial image. Because a diffraction-limited coherent optical imaging system may be readily characterized as a series of Fourier Transforms, it may be advantageous to employ FFTs to generate the aerial image of the design. All these transforms, when applied on pixel based image, may be regular pixel-based computations.

Further, the aerial image generation (box 126), in one embodiment, may be performed and/or accomplished by accelerator subsystem 116 using, for example, the bitmap image of the polygon design database as modified by additional processing (for example, anti-aliasing filtering techniques 122 and/or mask error modeling 124), if any.

During the aerial image generation/computation 126, the wafer-surface resist stack parameters (for example, thickness, BARC and/or refractive index) may be incorporated into the TCC equations. Various non-mask RET technologies may also be incorporated, for example, the off-axis illumination and pupil filtering, as part of the TCC computation equations. Further, the imperfections in optics, for example, aberration and/or light scattering, may also be incorporated in the aerial imaging equations, by accordingly modifying the pupil filtering from ideal case.

With continued reference to FIG. 4, the aerial image in the resist is responsible for exposing the resist itself. For a rigorous first-principle modeling (i.e., resist simulation 128), a 3D intensity distribution of the aerial image inside the resist may be employed. For certain embodiments of resist modeling, a 2D aerial image distribution on one plane may be employed, for example, the aerial image at a certain distance above the wafer surface. With the computed aerial image, many different resist models may be applied. A resist model simulates and/or models the physical and chemical processes and predicts the final developed resist edge location, and/or resist profile. Notably, all such models and modeling techniques, whether now known or later developed, are intended to be within the scope of the present invention.

In one embodiment, the edge locations and/or edge profile may be compared with experimental results, for example, SEM image, CD values measured by metrology tools (for example, CD-SEM, optical CD tools), to verify and calibrate the resist model parameters.

Notably, the resist modeling may be reduced to regular pixel-based computation, for example, filtering, re-mapping, and hence is suitable for hardware acceleration. As such, the resist modeling or simulation (box 128), in one embodiment, may be performed and/or accomplished by accelerator subsystem 116 using, for example, the binary bitmap image of the polygon design database (see, box 120) directly, or using the bitmap image of the polygon design database as modified by additional processing (for example, anti-aliasing filtering techniques 122 and/or mask error modeling 124), or directly to the aerial image generated thereby (see, box 126).

The next operation, also in a dashed box illustrated in FIG. 4, is the modeling of the substrate etching process (see, box 130). This operation is often unnecessary in current lithography simulation and/or analysis, since the etching process may be considered as a separate and independent process from lithography. However, the etch process may be incorporated into the present invention.

Simulation of substrate etching processes may also be reduced to pixel-based processing. As such, the etch process simulation (box 130), in one embodiment, may be performed and/or accomplished by accelerator subsystem 116 using, for example, the binary bitmap image of the polygon design database (see, box 120) directly, or using the bitmap image of the polygon design database as modified by additional processing (for example, anti-aliasing filtering techniques 122, mask error modeling 124, and/or resist simulation 128), or directly to the aerial image generated thereby (see, box 126).

With continued reference to FIG. 4, after determination and/or identification of edge locations of a design, the printed pattern on wafer may be determined, inspected, characterized and/or evaluated (see, box 132). By connecting the edge points identified, the simulated wafer pattern is constructed. These predicted wafer patterns may be used for various applications, for example, comparing to design-target (i.e., the desired pattern on wafer) to verify that the RET design is indeed achieving its goal and has not generated errors. A discussion of various and/or suitable applications (box 134) are provided in detail below.

In one embodiment of the present invention, hardware acceleration refers to the technique of using hardware (for example, electronic boards containing computing engines, communication chips and/or memories) that is more efficient for pixel-based type of computation than general purpose-type microprocessor based computing device. The accelerator hardware may be implemented with the highly configured and specifically programmed general purpose-type computing devices (for example, general purpose microprocessors and/or programmable logic devices), and, as such, offload significant computation processes from the microprocessor. In this way, the system computes simulation data in a more parallel and pipelined fashion.

For example, with reference to FIGS. 3, in one embodiment, the microprocessor subsystem of accelerator system 116 may handle those computations that heavily depend on case-based logic, for example, polygon conversion to bitmap representation thereof, while accelerator subsystem of accelerator system 116 handles those computations that have less (or little to no) data inter-dependency. As such, in this configuration, the computational intensive tasks performed by the accelerator subsystem may be parallelized and computed in a pipelined fashion, for example, image filtering (box 122 of FIG. 4), image transformations such as a Fourier Transform (box 126 of FIG. 4) and/or resist modeling/simulation (box 128 of FIG. 4).

Figure 5:
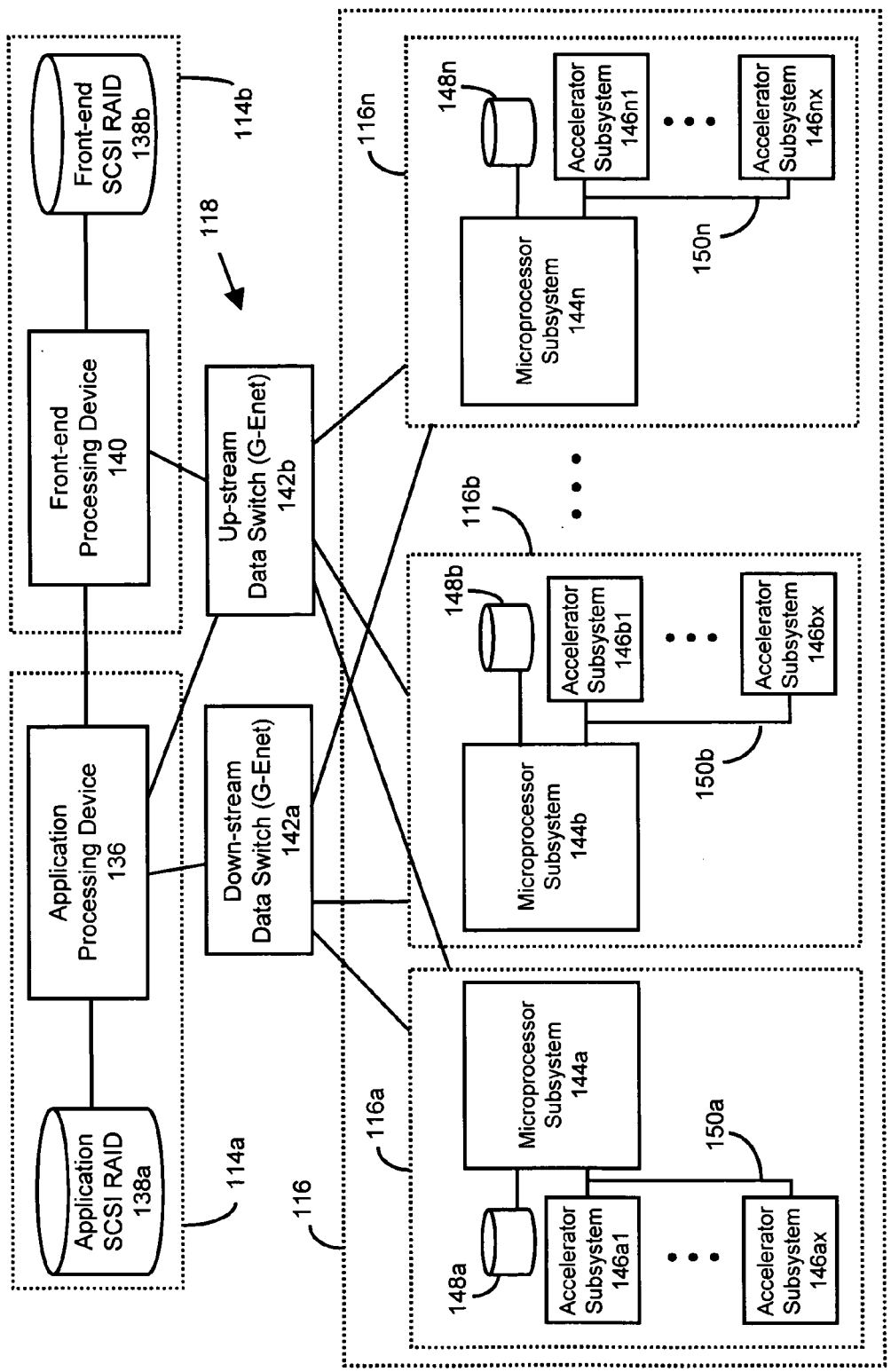
FIG. 5 is a schematic block diagram of a lithographic simulation system, according to certain embodiments of certain aspects of the present inventions.

With reference to FIG. 5, in one embodiment, system 110 includes one or more general purpose-type computing system 112, for example, application processing system 114a and front-end processing system 114b. The application processing system 114a is suitably configured to handle job management of the overall operations of system 110. In particular, in one embodiment, application processing system 114a includes application processing device 136 and application SCSI RAID 138a. The application processing device 136 is suitably programmed to provide management of the operations of the various components of system 110. In this regard, for example, application processing device 136 may be programmed to partition the design database for the various components of accelerator system 116, thereby specifying the individual jobs, functions or processes performed by components of accelerator system 116. The SCSI RAID hard-disk array 138a provides storage for the programs and data (for example, design database) used by application processing device 136.

The front-end processing system 114b includes front-end processing device 140 which is suitably programmed to handle or perform direct interaction with the user or operator (i.e., the "outside world") via, for example, client computer(s) (not illustrated) that provide operator or user access to system 110 for job setup and/or results review/analysis. The SCSI RAID hard-disk array 138b, associated with the front-end processing device should be a high capacity storage device, since hard-disk array 138b used to store results and images of many simulation jobs. The front-end processing system 114b also communicates with application processing system 114a, to provide or retrieve data to or from application SCSI RAID 138a (for example, the design database), and instructs the application processing system 114a to start a job, as instructed by the user or operator.

With continued reference to FIG. 5, application processing system 114a and front-end processing system 114b connect with accelerator system 116, for example, through high speed switches (for example, gigabit-Ethernet switches 142a and 142b). The switches 142a and 142b may be Dell 5224 Power Connect, manufactured and provided by Dell Computer (Austin, Tex., USA). The implementation and operation of the Dell 5224 Power Connect are described in detail in application notes, technical/journal articles and data sheets, all of which are incorporated by reference herein.

In one embodiment, all or substantially all of the actual computationally intensive tasks may be conducted by accelerator system 116, and, in particular, one or more accelerator components 116a–n. This architecture of the present invention allows scalable computation capacity, by changing the number of accelerator hardware components 116a–n. Moreover, this architecture also enables or enhances overall fault-tolerance of the system. For example, should a given accelerator hardware component 116a–n fail, its jobs may be re-assigned to the other accelerator hardware components 116a–n, and, in this way, system 110 maintains its operational condition/state.

In particular, accelerator system 116 may include one or more accelerator components 116a–n, each having one of microprocessor subsystem 144a–n (including one or more microprocessors), one or more accelerator subsystems 146a–n, and local or resident memory storage 148a–n coupled to an associated microprocessor subsystem 144a–n. The extent or amount of hardware acceleration capability may be balanced with microprocessor subsystems 144a–n, depending on the extent or amount of computation to be performed.

In one embodiment, microprocessor subsystems 144a–n each includes two Xeon microprocessors manufactured by Intel (Santa Clara, Calif., USA). The accelerator subsystems 146a–n each includes a plurality of Application-Specific Integrated Circuit (ASIC), special-purpose DSP integrated circuits, and/or programmable gate arrays (for example, field-programmable gate arrays ("FPGAs")). In fact, each of the accelerator subsystem 146a–n may include multiple accelerator subsystems, for example, accelerator subsystem 146a may include all the accelerator subsystems 146a1–146ax, as illustrated in FIG. 5. In this way, when fully utilized, each of the accelerator subsystems 146a–n contains computational capacity of roughly twenty-five Xeon microprocessors.

The bus 150a–n facilitates high-speed communication between microprocessor subsystem 144a–n and associated accelerator subsystem(s) 146a–n. The communication protocols and techniques on bus 150a–n may be PCI, PCIX, or other high-speed communication protocols and techniques. Indeed, any high-speed technique, whether now known or later developed, may be implemented over bus 150a–n. Notably, in one embodiment, the bus interface may be implemented using a 21P100BGC PCI-X bridge (64 bit/133 MHz) from International Business Machines Corporation (Armonk, N.Y., USA). The implementation and operation of the 21P100BGC are described in detail in application notes, technical/journal articles and data sheets, all of which are incorporated by reference herein.

Figure 6:
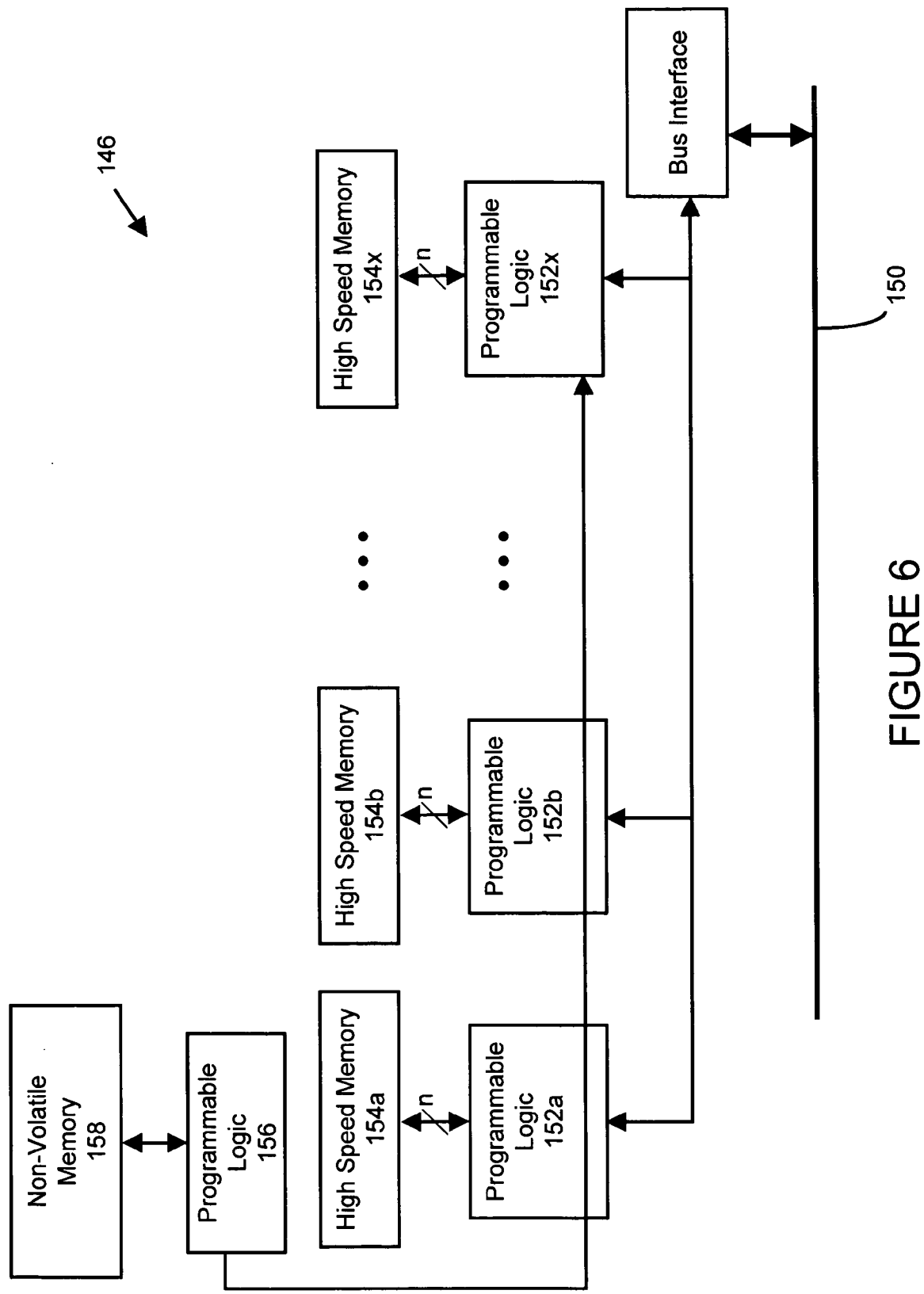
FIG. 6 is a schematic block diagram of an accelerator subsystem architecture of FIG. 5, according to certain embodiments of the present inventions.

With reference to FIG. 6, in one embodiment, each accelerator subsystem 146a–n includes a plurality of programmable logic integrated circuits 152a–x, for example, high-end FPGA, coupled to associated high speed memory 154a–x (for example, DDR SDRAM, MT46V2M32V1 from Micron Technologies of Boise, Id., USA) via a bus (for example, 64 bit/266 MHz). In one embodiment, four FPGAs are implemented, each including 3 million gates. The FPGAs may be XC2V3000, manufactured by Xilinx (San Jose, Calif., USA). The implementation and operation of the XC2V3000 are described in detail in application notes, technical/journal articles and data sheets, all of which are incorporated by reference herein.

The programmable logic 152a–x are suitably programmed and configured to perform all or substantially all of the computations that have less (or little to no) data inter-dependency, for example, the anti-aliasing filtering techniques (box 122 of FIG. 4), mask error modeling (box 124 of FIG. 4), aerial image generation (box 126 of FIG. 4), resist simulation (box 128 of FIG. 4) and/or wafer patter generation processing (box 132 of FIG. 4). As such, programmable logic 152a–x is not employed to address those tasks that heavily depend on case-based logic, for example, polygon conversion to binary bitmap (box 120 of FIG. 4).

With continued reference to FIG. 6, each accelerator subsystem 146a–n further includes programmable logic 156, for example, complex programmable logic device ("CPLD") coupled to associated non-volatile memory 158 (for example, Flash memory, TE28F128J3A-150 from Intel (Santa Clara, Calif., USA). In one embodiment, CPLD may be XCR3384XL-10TQ144, manufactured by Xilinx (San Jose, Calif., USA). In short, the CPLD is used to program FPGA by transferring FPGA code from the FLASH. The implementation and operation of the XCR3384XL-10TQ144 are described in detail in application notes, technical/journal articles and data sheets, all of which are incorporated by reference herein.

In one embodiment, the computations that may be or are performed by accelerator subsystems 146a–n include, for example, anti-aliasing filtering and down-sampling, FFTs for aerial image computation, image filtering and/or thresholding operations in resist modeling. The computations that may be handled by microprocessor subsystem 144a–n include: polygon to binary bitmap conversation, application programs or processes (for example, RET verification through comparison, defect merging). The partitioning of computing tasks between microprocessor subsystem 144a–n and accelerator subsystems 146a–n is application-dependent and may vary from application to application or job to job. The optimal partitioning is to balance the computation time between accelerator subsystems 146a–n and microprocessor subsystem 144a–n, so that neither of the two subsystems would spend much of time waiting for the results from the other subsystems.

In one embodiment, the components of system 110, including application processing system 114a, front end processing system 114b and accelerator system 116, may be mounted together as a rack-mount system.

The system 110 is capable of rapid lithography simulation, inspection, characterization and/or evaluation of the optical characteristics and/or properties, as well as the effects and/or interactions of lithographic systems and processing techniques. The system 110 may be employed in many applications, for example, verification, inspection, characterization and/or evaluation of the lithographic designs, techniques and/or systems, and/or individual functions performed thereby or components used therein. Several of the applications are listed and described below. It should be noted that this list of applications is not exhaustive. Indeed, system 110 may be used in all the applications that depend on lithography simulation, inspection, characterization and/or evaluation of a semiconductor design and/or manufacturing, and as such all applications, whether now known or later developed, are intended to be within the present invention.

In one application, system 110 may be implemented for fast RET verification, inspection and/or characterization. RET verification may refer to the procedure that uses detailed simulation of the entire lithography process to verify that the RET design achieves the desired, anticipated and/or acceptable results in the final wafer pattern. The desired, anticipated and/or acceptable results on wafer 22 are usually part of the design database, sometimes referred to as reference layer or design-target layer. The post-RET design database is also part of the design database. After obtaining the simulated wafer pattern using the post-RET design database, the wafer pattern may be compared with the reference layer, and deviations may then be highlighted, characterized and/or analyzed.

Further, interlayer characterization and/or analysis may be employed to determine the overlay margin. For example, the overlay between contact and poly layer is critical in IC manufacturing. Too little or small overlay may cause a lower chip yield. The present invention may be employed to analyze the amount of overlay margin between two related or unrelated layers, for example, by comparing their correspondingly simulated wafer resist pattern. Notably, places or locations where the margin is too small may be highlighted to, for example, analyze in greater detail.

The speed of simulation and/or characterization of RET designs using the present invention enables RET verification to be conducted at one, some or all of the different points in the process window (i.e., the acceptable lithography process variation in focus and exposure dose). While the RET design may be acceptable at certain or given points in the process window (a combination of a dose and a focus), it may produce too large of a deviation at other points in the process window. As such, a more thorough and exhaustive RET design verification includes analysis and/or simulation of all the points in the lithography process window.

Notably, the present invention may generalize the process window to include many other process parameters beyond focus and dose, for example, illuminations, mask errors, stepper aberrations and/or resist thickness. In this situation, the process window becomes a volume in a hyper-dimensional space.

Besides the edge placement, line-end placement, line break/bridging, CD errors, and/or any other errors that are determined by the on-wafer edge locations, the present invention may be employed to analyze the wafer pattern's printing sensitivity to process variation, for example, mask error, focus, dose, numerical aperture, illumination aperture, aberration, or other process parameters. The printing sensitivity refers to the derivative of the wafer pattern error vs. the process parameter change. The analysis can be achieved by introducing a small change in the process parameters, and analyze the resulting wafer pattern characteristics. The higher the sensitivity, the worse the design's robustness is.

For example, in the context of CD sensitivity, the present invention may be employed to analyze the following derivatives as CD's sensitivity to those corresponding process parameters:

dCD_on_wafer/dCD_error_on_mask. Where "d" is referring to derivative. This specific sensitivity is the derivative of the "CD_on-wafer" vs. "CD_error_on_mask", i.e., for a unit amount of change in "CD_error_on_mask", the amount of change in "CD_on_wafer". This sensitivity is often called as MEEF, i.e., Mask Error Enhancement Factor. Two sub-cases can be used:

Global mask error MEEF. In this case, all patterns on mask are biased at the same time. This sensitivity relates to mask bias variation across mask.

Local mask error MEEF. In this case, only a single local pattern on mask is assumed to have CD error. This sensitivity relates to mask defect.

dCD/dFocus_of_stepper, i.e., on-wafer CD's sensitivity vs. stepper focus.

dCD/dDose_of_stepper, i.e., on-wafer CD's sensitivity vs. stepper's exposure dose.

dCD/dAberration_of_stepper, i.e., on-wafer CD's sensitivity vs. stepper's aberration.

dCD/dIllumination_pupil_of_stepper, i.e., on-wafer CD's sensitivity vs. stepper's illumination pupil (e.g., its size and shape, and the illumination distribution within the pupil).

dCD/dNA_of_stepper, i.e., on-wafer CD's sensitivity vs. stepper's numerical aperture.

dCD/dThickness_of_resist, i.e., on-wafer CD's sensitivity vs. the resist thickness on wafer.

dCD/dRefractive_index_of_resist, i.e., on-wafer CD's sensitivity vs. the resist's refractive index on wafer.

dCD/dResist_stack, i.e., on-wafer CD's sensitivity vs. the resist stack's parameters (e.g., thickness of BARC).

dCD/dFlare_of_stepper, on-wafer CD's sensitivity vs. the stepper's flare amount.

dCD/dResist_processing_parameters, i.e., on-wafer CD's sensitivity vs. the resist processing parameters (e.g., for example, resist baking time, resist development time).

The above sensitivity values may be referred to as Design-for-Manufacturability, or DFM metrics. The present invention may employ the DFM metrics to perform process sensitivity inspection, and determine the process weak points in design. That is, the present invention may be employed to identify design locations that have the sensitivity over certain threshold. Additional functions in this DFM metric analysis may include:

ANOVA analysis (which is a standard technique in statistical analysis of experimental results) to identify key sensitivity contributing factors and interaction between the factors Complete process window determination beyond Dose-Focus window Identify the design locations that limit the process window Give recommendations of design modifications that enhance process window It should be noted that all of the above analysis and verification/inspection may be conducted for the unique or generic characteristics of a specific or particular stepper or scanner. For example, a wafer fabrication facility may have a plurality of the same or different steppers; each stepper includes own "signature" of aberrations or characteristics. As such, the set of aberrations or characteristics may be incorporated into the simulation process (for example, during the aerial image generation (box 126 of FIG. 4)) to analyze the design's suitability for that individual stepper. Simulation for multiple steppers may also be used to select the best stepper(s) for the specific design.

It should also be noted that the RET verification, the multi-process-point analysis, the process-sensitivity analysis, and all other analysis mentioned above, may be applied to either full chip design, or in a localized region, depending on user need. Localized region may be particularly useful for interactive analysis and review. For example, the circuit designer may use the localized area analysis to fine-tune a design of small area libraries, or to fine-tune the small area design before the full chip design is complete.

The fast simulation may also be used in optimization of lithography settings, for example, searching for enhanced and/or the optimal (i) illumination and NA settings, (ii) resist processing parameters (for example, baking time, development time), and (iii) resist stack design (for example, resist thickness, BARC layer structure).

In fact, the fast simulation may be used in or during the RET design itself, i.e., searching for enhanced and/or the optimal RET decoration that provides or produces the enhanced results on wafer patterning, in terms of, for example, edge displacement, as compared to desired pattern on wafer. The RET design may also at the same time optimize process window size and the DFM metrics. During RET verification and/or inspection, this design capability may also be used to produce recommended modification to RET design at defective design locations.

Further, the present invention may be employed to co-optimize or co-enhance the RET decoration and the lithography settings. For example, the OPC design may be co-optimized with illumination methodology. By selecting appropriate illumination together with the OPC design (i.e., optimizing the illumination and OPC design simultaneously), the present invention may simplify the OPC decoration without sacrificing the final patterning quality and robustness. Notably, this approach may reduce the mask making complexity and hence reduce the mask cost.

The present invention may also be employed to enhance and/or optimize implementation of other RET technologies, for example, multiple-exposure. Multiple-exposure refers to the technique of breaking up the patterns into multiple exposing passes, so that each exposure only prints part of the pattern with reduced interaction between the patterns (due to, for example, the increased distance between the patterns). One existing technique called "double exposure" breaks the patterns into x- and y-oriented patterns, and employs x- and y-dipole illumination for them, respectively. Assuming two exposures or a fixed number of exposures, the optimal decomposition may not be as simple as an x- and y-separation, but may depend on the circuit pattern itself. The present invention may be employed to search and analyze the optimal decomposition of the chip pattern for multiple exposures. For example, all exposures may employ the same illumination, or the illumination may be different for each exposure in order to enhance and/or optimize the process.

The illumination-decomposition co-optimization may further improve lithography quality and robustness. Further, optimization can include co-optimization together with other lithography parameters, for example, OPC design, NA, pupil filtering. Notably, all these optimization and co-optimization may be enhanced using the system and technique of the present invention.

Further, the system of the present invention, when equipped with the process parameters used in a semiconductor foundry, can serve as the "ambassador" from foundry to its chip design customers. That is, the system encapsulates the critical process and tool information, and used by foundry's chip design customers to assess, measure, and optimize their designs for their specific foundry partner, without directly accessing their foundries' proprietary process details.

Moreover, the system and technique of the present invention may feed-forward its simulation results to metrology tools. That is, the system's results are provided to different metrology and inspection tools in the mask shop and wafer fabrication facility. For instance, it may be useful to define "context-sensitive" mask design and manufacturing, for example, insensitive areas can have relaxed inspection tolerances. It may also help to focus the existing metrology and inspection resources in the wafer fabrication facility so that they concentrate on the "marginal areas", for example, physical RET-design-inspection using metrology tools for those RET weak points identified in multi-process window inspection and process sensitivity inspection.

Figure 7:
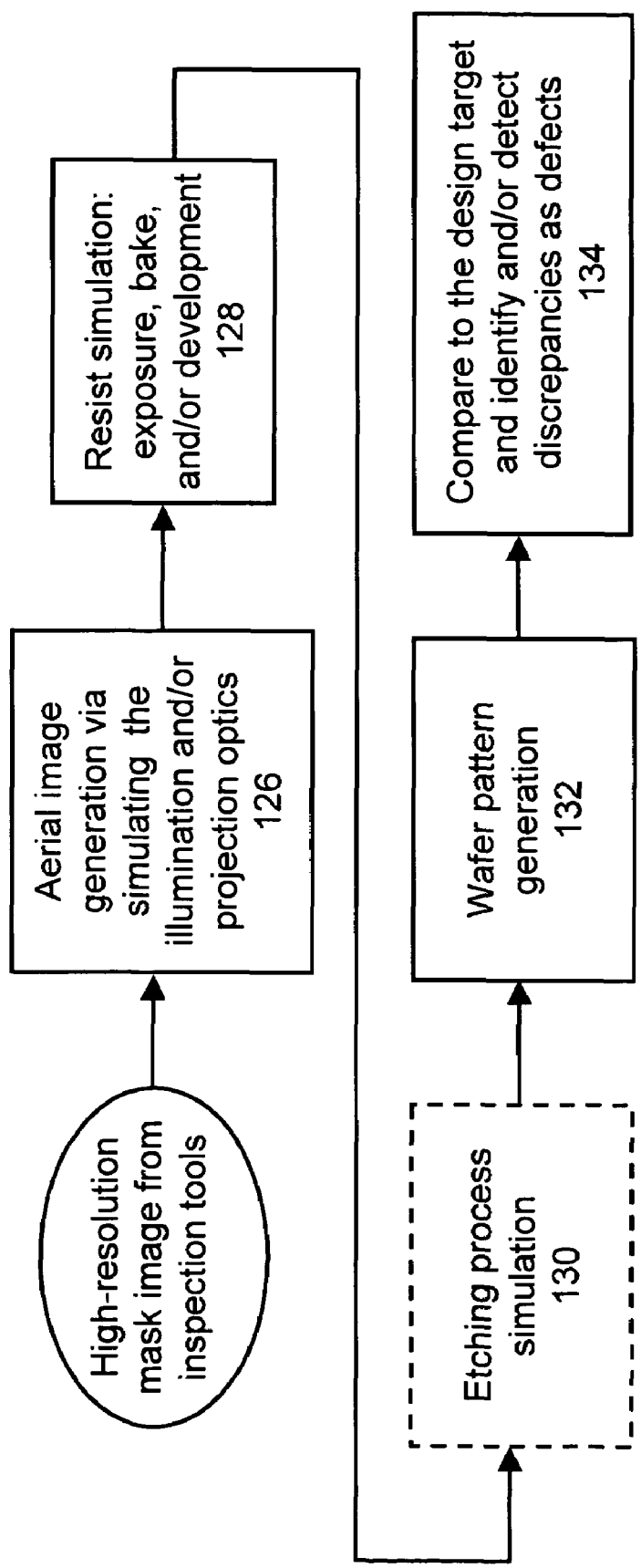
FIG. 7 is a flow chart of the D:T inspection process, according to certain embodiments of certain aspects of the present inventions.

The system and technique of the present invention may be combined with a conventional mask inspection system (for example, TeraScan DUV Reticle Inspection System from KLA-Tencor Corporation of San Jose, Calif., USA), to conduct real-time simulated wafer pattern inspection. For example, conventional lithographic and/or mask inspection systems capture high-resolution image(s) of a mask. The captured, high-resolution images may have a higher resolution for mask patterns than the mask pattern's aerial image printed on wafer; as such, the conventional lithographic and/or mask inspection systems may provide more data, details and/or information regarding the pattern disposed on the mask. These high-resolution images may be provided to the system of the present invention to simulate, analyze and/or characterize the predicted wafer pattern either in resist and/or after substrate etching, which is in turn compared with the desired circuit pattern on wafer. When there is deviation, a defect may be identified. Doing so not only verifies that the mask is fabricated according to a desired post-RET design, but also verifies that the realization of the RET design on mask will create the desired results on wafer. This inspection mode is different from current mask inspection industry's practices of D:D or D:DB inspection, since this inspection mode compares a simulated on-wafer in-resist or after-etch pattern to the design target, therefore realizing a Die-To-Target (D:T) inspection mode. FIG. 7 illustrates an exemplary process flow of D:T inspection.

D:T inspection mode need not use the post-RET design database. Instead, the D:T inspection mode may use the high-resolution image captured by the mask inspection tool as the post-RET data to simulate the in-resist or after-etch image or pattern on wafer. D:T inspection technique may then employ the simulated in-resist or after-etch pattern to compare to the design's on-wafer target pattern.

The D:T inspection mode is a highly dynamic-per-pixel-printability inspection method for masks because it only captures the defects that affect the printed wafer circuit pattern, and does not report those defects that do not change the wafer circuit pattern, which are known as nuisance defects (i.e., defects that do not affect chip yield). By eliminating the nuisance defects, D:T inspection may reduce un-necessary mask "scraps", improve mask yield, and/or reduce mask cost. D:T may also capture, detect and/or identify mask defects that are "below" the detection threshold of D:D or D:DB inspection but affect the wafer circuit pattern when combined with lithography optics (of, for example, a stepper or scanner) and the wafer resist processing, thereby reducing the possibility of wafer yield loss.

Notably, the D:T inspection technique may be integrated and/or combined with D:DB inspection techniques, to identify additional, false and/or undetected defects in the RET design. For example, where the D:T inspection technique detects and/or identifies a significant defect, but D:DB inspection technique does not detect and/or identify that defect or defective area on mask (i.e., the mask is just as designed according to post-RET database), it is likely that the RET design at the defective area includes or is in error (i.e., the design cannot produce the desired wafer pattern even though the mask is made according to that design).

In another aspect, D:T inspection may also improve the inspectability of masks. The small and complex OPC features make traditional D:D or D:DB inspection very challenged. Many small OPC feature may be flagged as "defect" (i.e., false defect), reducing the inspectability and hence creating constrains in OPC design. With D:T inspection, the high-resolution image is directly used to simulate the on-wafer in-resist or after-etch pattern, where all small OPC features have been filtered out. The comparison to design target no longer involves small OPC features and hence false defect rate may be reduced.

Notably, the product literature, application notes, technical/journal articles, and operator's manual(s) of the TeraScan DUV Reticle Inspection System from KLA-Tencor Corporation are incorporated by reference herein.

In another embodiment for mask inspection technique according to the present inventions, the systems, devices and/or techniques described and illustrated in non-provisional patent application "System and Method for Lithography Process Monitoring and Control", which was filed on Mar. 18, 2003 and assigned Ser. No. 10/390,806 (hereinafter "Lithography Process Monitoring and Control Patent Application"), may be employed, in conjunction with the invention(s) of the present invention, to measure, inspect, characterize and/or evaluate optical lithographic equipment, methods, and/or sub-systems related thereto (for example, the optical sub-systems and control systems of the equipment as well as photomasks used therewith). In this regard, the aerial image(s) sampled and/or collected using the systems and techniques of the Lithography Process Monitoring and Control Patent Application may be provided to the system of the present invention to compare with the simulated and/or predicted wafer pattern. In this mode, the system of the present invention provides the simulated aerial image using the post-RET database and the optical settings of the lithographic equipment (notably, the resist development and substrate etch simulations are omitted if only aerial image is needed), and the systems and techniques of the Lithography Process Monitoring and Control Patent Application provide the actual aerial image captured from inside the lithographic equipment. This may be done on a pixel-by-pixel basis to identify deviations/defects therebetween.

In particular, this mask inspection technique detects or identifies defects in a lithographic design using a simulated lithographic design and a measured aerial image of the lithographic design. The method includes generating a pixel-based bitmap representation of the lithographic design, wherein the pixel-based bitmap includes pixel data, and each pixel datum represents a pixel having a predetermined pixel size (as described above). The method generates a simulated aerial image of the lithographic design using the pixel-based bitmap representation of the lithographic design.

The method further includes measuring image data to generate a measured aerial image of the lithographic design wherein the measured aerial image is a pixel-based bitmap representation of the lithographic design produced by a lithographic tool at a wafer plane. Thereafter, the method compares the measured aerial image of the lithographic design and the simulated aerial image of the lithographic design to detect potential errors in the lithographic design. Moreover, the method may also compare the simulated aerial image of the lithographic design to a desired, predetermined pattern contained in a database.

As described above, the pixel-based bitmap representation of the lithographic design may include converting a plurality of polygons arranged in a predetermined configuration to a pixel-based bitmap representation thereof. The pixel-based bitmap may be a gray-level image which is representative of the plurality of polygons.

Further, the pixel size may be determined as described above. In one embodiment, the pixel size may be greater than the Nyquist frequency in the aerial image of the lithographic design and/or determined using the numerical aperture and wavelength of a projection optics of a lithographic tool.

Of course, this method may be implemented on one or more of the embodiments of the system of the present invention. Indeed, all of the embodiments, inventions, features and/or techniques described above with respect of the other inspection techniques may be implemented in the mask inspection technique that detects or identifies defects in a lithographic design using a simulated lithographic design and a measured aerial image of the lithographic design. For the sake of brevity, those discussions will not be repeated.

Notably, as mentioned above, the inventions described and illustrated in the aforementioned patent application may be employed to collect actual wafer pattern for mask inspection. For the sake of brevity, those discussions will not be repeated here; rather, it is expressly noted, however, that the entire contents of the aforementioned patent application, including, for example, the features, attributes, alternatives, materials, techniques and advantages of all of the inventions, are incorporated by reference herein.

There are many inventions described and illustrated herein. While certain embodiments, features, materials, configurations, attributes and advantages of the inventions have been described and illustrated, it should be understood that many other, as well as different and/or similar embodiments, features, materials, configurations, attributes, structures and advantages of the present inventions that are apparent from the description, illustration and claims. As such, the embodiments, features, materials, configurations, attributes, structures and advantages of the inventions described and illustrated herein are not exhaustive, and it should be understood that such other, similar, as well as different, embodiments, features, materials, configurations, attributes, structures and advantages of the present inventions are within the scope of the present invention.

In particular, in one application, this system facilitates and enables rapid verification or inspection of RET design. This refers to the procedure that uses detailed simulation of the entire lithography process to verify, characterize and/or analyze a RET design, including with respect to the desired/anticipated results on final wafer pattern.

What is claimed is:

1. A method for evaluating a response of a lithographic design on wafer to a change in at least one process parameter of a photolithographic process, wherein the photolithographic process uses photolithographic equipment, the method comprising:

generating a pixel-based bitmap representation of a lithographic design, wherein the pixel-based bitmap includes pixel data, and wherein each pixel datum represents a pixel having a predetermined pixel size;

generating a first simulated image of the lithographic design on wafer using (1) the pixel-based bitmap representation of the lithographic design and (2) a first relationship representing an imaging path of projection and illumination optics of the photolithographic process;

generating a second simulated image of the lithographic design on wafer using (1) the pixel-based bitmap representation of the lithographic design and (2) a second relationship representing an imaging path of projection and illumination optics of the photolithographic process;

wherein a difference between (i) the first relationship representing the imaging path of the projection and illumination optics of the photolithographic process and (ii) the second relationship representing the imaging path of the projection and illumination optics of the photolithographic process includes the change in the at least one process parameter of the photolithographic process; and determining the response of the lithographic design on wafer to the change in the at least one process parameter of the photolithographic process using the first simulated image and the second simulated image.

2. The method of claim 1, wherein lithographic design includes a plurality of polygons arranged in a predetermined configuration.

3. The method of claim 1, wherein the change in the at least one process parameter of the photolithographic process is a change in focus, illumination dose, numerical aperture or illumination aperture of the photolithographic equipment.

4. The method of claim 1, wherein lithographic design is a localized region of an integrated circuit design.

5. The method of claim 1, further including determining a configuration of settings of the photolithographic equipment using the determination of the response of the lithographic design on wafer to the change in the at least one process parameter of the photolithographic process.

6. The method of claim 5, wherein the configuration of settings of the photolithographic equipment includes at least one of the focus, illumination dose, numerical aperture or illumination aperture of the photolithographic equipment.

7. The method of claim 1, further including determining lithography settings using the determination of the response of the lithographic design on wafer to the change in the at least one process parameter of the photolithographic process.

8. The method of claim 7, wherein the lithographic settings include at least one of the photolithographic settings of the photolithographic equipment, resist processing parameters or resist stack design.

9. The method of claim 1, wherein the pixel-based bitmap is a gray-level image which is representative of a plurality of polygons.

10. The method of claim 1, wherein the predetermined pixel size provides a sampling frequency that is greater than a Nyquist frequency in an image of the lithographic design on wafer.

11. The method of claim 1, wherein the predetermined pixel size is determined using a numerical aperture and wavelength of projection optics of the photolithographic equipment.

12. The method of claim 1, wherein the lithographic design includes resolution enhancement technology.

13. The method of claim 1, wherein the first and second relationships representing the imaging path of the projection and illumination optics are coefficient matrices representing the imaging path of the projection and illumination optics of the photolithographic equipment.

14. The method of claim 13, wherein each coefficient matrix is representative of one or more of a focus, dose, numerical aperture, illumination aperture, and aberration of the photolithographic equipment.

15. The method of claim 13, wherein each coefficient matrix representing the imaging path of the projection and illumination optics of the photolithographic equipment includes transmission cross coefficients.

16. The method of claim 1, wherein the relationship representing the imaging path of the projection and illumination optics of the photolithographic equipment includes formulas including a focus, dose, numerical aperture, illumination aperture, and aberration of the photolithographic equipment.

17. The method of claim 1, wherein determining the response of the lithographic design on wafer to the change in the at least one process parameter of the photolithographic process using the first simulated image and the second simulated image further includes determining the a critical dimension sensitivity of the lithographic design to the change in the at least one process parameter of the photolithographic process.

18. The method of claim 17, wherein determining the critical dimension sensitivity of the lithographic design to the change in the at least one process parameter of the photolithographic process further includes determining a plurality of derivatives as the critical dimension sensitivity of the lithographic design.

19. The method of claim 1, wherein the change in the at least one process parameter of the photolithographic process is a change in a bias or an error in a critical dimension of a photomask containing the lithographic design.

20. A system for evaluating a response of a lithographic design on wafer to a change in at least one process parameter of a photolithographic process, wherein the photolithographic process uses photolithographic equipment, the system comprising:
   a microprocessor subsystem, including a plurality of microprocessors, to convert a lithographic design to a pixel-based bitmap representation thereof, wherein the pixel-based bitmap includes pixel data, and wherein each pixel datum represents a pixel having a predetermined pixel size; and
   a plurality of accelerator subsystems, each accelerator subsystem includes a plurality of programmable integrated circuits configured to process the pixel-based bitmap of the lithographic design in parallel, and each accelerator subsystem Is connected to an associated microprocessor to calculate a portion of a plurality of simulated images of the lithographic design on wafer using (1) a corresponding portion of the pixel-based bitmap representation of the lithographic design and (2) a plurality of relationships representing an imaging path of projection and illumination optics of the photolithographic process, wherein a difference between the relationships representing an imaging path of projection and illumination optics of the photolithographic process includes the at least one process parameter of the photolithographic process; and
   a data processing system to determine the response of the lithographic design on wafer to the change in the at least one process parameter of the photolithographic process using the plurality of simulated images of the lithographic design on wafer.

21. The system of claim 20, wherein lithographic design includes a plurality of polygons arranged in a predetermined configuration.

22. The system of claim 21, wherein the pixel-based bitmap is a gray-level image which is representative of a plurality of polygons.

23. The system of claim 20, wherein the change in the at least one process parameter of the photolithographic process is a change in focus, illumination dose, numerical aperture or illumination aperture of the photolithographic equipment.

24. The system of claim 20, wherein the change in the at least one process parameter of the photolithographic process is a change in a bias or an error in a critical dimension of a photomask containing the lithographic design.

25. The system of claim 20, wherein the predetermined pixel size provides a sampling frequency that is greater than a Nyquist frequency in the image of the lithographic design on wafer.

26. The system of claim 20, wherein the predetermined pixel size is determined using a numerical aperture and wavelength of the projection optics of the photolithographic equipment.

27. The system of claim 20, wherein the plurality of relationships representing the imaging path of the projection and illumination optics includes a coefficient matrix representing the imaging path of the projection and illumination optics of the photolithographic equipment.

28. The system of claim 27, wherein the coefficient matrix representing the imaging path of the projection and illumination optics of the photolithographic equipment is representative of one or more of a focus, dose, numerical aperture, illumination aperture, and aberration of the photolithographic equipment.

29. The system of claim 28, wherein the coefficient matrix representing the imaging path of the projection and illumination optics of the photolithographic equipment are transmission cross coefficients.

30. The system of claim 20, wherein the system determines a set of parameters representing the imaging path of the projection and illumination optics of the photolithographic process using the one or more of a focus, dose, numerical aperture, illumination aperture, and aberration of the photolithographic equipment.

31. The system of claim 20, wherein lithographic design is a localized region of an integrated circuit design.

32. The system of claim 20, wherein the data processing system calculates settings of the photolithographic equipment using the determination of the response of the lithographic design on wafer to the change in the at least one process parameter of the photolithographic process.

33. The system of claim 32, wherein the settings of the photolithographic equipment include at least one of the focus, illumination dose, numerical aperture or illumination aperture of the photolithographic equipment.

34. The system of claim 20, wherein the lithographic design includes resolution enhancement technology.

35. The system of claim 20, wherein the data processing system determines the a critical dimension sensitivity of the lithographic design on wafer to the change in the at least one process parameter of the photolithographic process using the plurality of simulated images.

36. The system of claim 35, wherein the critical dimension sensitivity of the lithographic design to the change in the at least one process parameter of the photolithographic process includes a plurality of derivatives as the critical dimension sensitivity of the lithographic design.

37. The system of claim 20, wherein the data processing system determines a set of parameters of the projection and illumination optics of the photolithographic process using the response of the lithographic design on wafer to the change in the at least one process parameter of the photolithographic process using the plurality of simulated images of the lithographic design on wafer.

38. The system of claim 20, wherein the data processing system detects an error in the lithographic design based on the response of the lithographic design on wafer to the change in the at least one process parameter of the photolithographic process using the plurality of simulated images of the lithographic design on wafer.

39. The system of claim 38, wherein, in response to detecting the error, the data processing system determines a modification to the lithographic design to correct the error in the lithographic design on wafer.

40. The system of claim 38, wherein, in response to detecting the error, the data processing system determines a modification to at least one parameter of the projection and illumination optics of the photolithographic process to correct the error in the lithographic design on wafer.

41. A method for evaluating a response of a lithographic design on wafer to changes in a plurality of process parameters of a photolithographic process, the method comprising:
generating a pixel-based bitmap representation of a lithographic design, wherein the pixel-based bitmap includes pixel data, and wherein each pixel datum represents a pixel having a predetermined pixel size;
generating a plurality of simulated images of the lithographic design on wafer using (1) the pixel-based bitmap representation of the lithographic design and (2) a plurality of relationships representing an imaging path of projection and illumination optics of the photolithographic process wherein at least one relationship representing the imaging path of the projection and illumination optics of the photolithographic process is different from another relationship representing an imaging path of projection and illumination optics of the photolithographic process and wherein the difference includes the process parameters of the photolithographic process; and
determining the response of the lithographic design on wafer to the changes in the plurality of process parameters of the photolithographic process using the plurality of simulated images of the lithographic design on wafer.

42. The method of claim 41, wherein lithographic design includes a plurality of polygons arranged in a predetermined configuration.

43. The method of claim 41, wherein the changes in the plurality of process parameters include at least two of a change in focus, illumination dose, numerical aperture and illumination aperture of the photolithographic equipment.

44. The method of claim 41, wherein the changes in the plurality of process parameters of the photolithographic process includes a change in a bias or an error in a critical dimension of a photomask containing the lithographic design.

45. The method of claim 41, wherein lithographic design is a localized region of an integrated circuit design.

46. The method of claim 41, further including determining a configuration of settings of the photolithographic equipment using the determination of the response of the lithographic design on wafer to the changes in the plurality of process parameters of the photolithographic process.

47. The method of claim 46, wherein the configuration of settings of the photolithographic equipment includes at least two of the focus, illuminator dose, numerical aperture or illumination aperture of the photolithographic equipment.

48. The method of claim 41, wherein the pixel-based bitmap is a gray-level image which is representative of a plurality of polygons.

49. The method of claim 41, wherein the predetermined pixel size provides a sampling frequency that is greater than a Nyquist frequency in the image of the lithographic design on wafer.

50. The method of claim 41, wherein the predetermined pixel size is determined using a numerical aperture and wavelength of projection optics of the photolithographic equipment.

51. The method of claim 41, wherein the lithographic design includes resolution enhancement technology.

52. The method of claim 41, wherein the plurality of relationships representing the imaging path of the projection and illumination optics each include a coefficient matrix representing the imaging path of the projection and illumination optics of the photolithographic equipment.

53. The method of claim 41, wherein determining the response of the lithographic design on wafer to changes in the plurality of process parameters of the photolithographic process using the plurality of simulated images includes determining a critical dimension sensitivity of the lithographic design to the changes in the plurality of process parameters of the photolithographic process.

54. The method of claim 53, wherein determining the critical dimension sensitivity of the lithographic design to the changes in the process parameters of the photolithographic process further includes determining a plurality of derivatives as the critical dimension sensitivity of the lithographic design.

* * * * *